United States Patent [19]

Molyneux et al.

[11] Patent Number: 4,886,960

[45] Date of Patent: Dec. 12, 1989

[54] CONTROL CIRCUIT FOR AN AUTOMATIC REARVIEW MIRROR

[75] Inventors: Keith W. Molyneux, Ballymore Eustace; Thomas D. Gaffney, Bray, both of Ireland

[73] Assignee: Donnelly Mirrors Limited, Naas, Ireland

[21] Appl. No.: 177,614

[22] Filed: Apr. 5, 1988

[30] Foreign Application Priority Data

Apr. 8, 1987 [IE] Ireland .................................. 918/87

[51] Int. Cl.$^4$ ............................................. H01J 40/14
[52] U.S. Cl. ............................. 250/209; 250/214 AL
[58] Field of Search .................. 250/208, 209, 214 R, 250/214 AL; 350/278, 279, 280, 281

[56] References Cited

U.S. PATENT DOCUMENTS

| | | | |
|---|---|---|---|
| 3,601,614 | 8/1971 | Platzer | 250/209 |
| 4,443,057 | 4/1984 | Bauer et al. | 250/214 B |
| 4,572,619 | 2/1986 | Reininger et al. | 350/392 |
| 4,580,875 | 4/1986 | Bechtel et al. | 350/281 |
| 4,603,946 | 8/1986 | Kato et al. | 350/279 |
| 4,669,825 | 6/1987 | Itoh et al. | 350/332 |
| 4,676,601 | 6/1987 | Itoh et al. | 350/278 |
| 4,690,508 | 9/1987 | Jacob | 350/331 |
| 4,697,883 | 10/1987 | Suzuki et al. | 350/331 |
| 4,701,022 | 10/1987 | Jacob | 350/278 |
| 4,793,690 | 12/1988 | Gahan et al. | 350/279 |

FOREIGN PATENT DOCUMENTS

| | | |
|---|---|---|
| 2732727 | 3/1978 | Fed. Rep. of Germany . |
| 3041692 | 5/1981 | Fed. Rep. of Germany . |
| 5819941 | 3/1981 | Japan . |
| 60-121141 | 6/1985 | Japan . |
| 1131236 | 10/1968 | United Kingdom . |
| 2119087 | 10/1983 | United Kingdom . |

Primary Examiner—David C. Nelms
Attorney, Agent, or Firm—Price, Heneveld, Cooper, DeWitt & Litton

[57] ABSTRACT

The invention provides an automatic rearview mirror system (10) for a vehicle comprising a reflective element (22) actuatable between at least two different reflective conditions. The system includes a forward light sensor (11) to detect light forward of the vehicle and a rear light sensor (12) to detect light rearward of the mirror. A control circuit means (14,16) is coupled to the reflective element (22), the forward light sensor (11) and the rear light sensor (12). The control circuit causes the reflective element to assume a reflective state dependent upon the output of the forward and rear light sensors. The control circuit includes means for modifying the output of the forward light sensor (11) to cause a reduction in the sensitivity of the mirror.

16 Claims, 5 Drawing Sheets

CONTROL CIRCUIT FOR AN AUTOMATIC REARVIEW MIRROR

The present invention relates to rearview mirrors, and in particular, to rearview mirrors capable of automatically changing their reflective states in response to varying light levels.

"Automatic" day/night rearview mirrors have been developed which automatically switch a mirror prism between full (day) and partial (night) reflectance conditions in response to sensed light levels. One such mirror is illustrated in U.S. Pat. No. 4,580,875, issued Apr. 8, 1986 to GENTEX Corporation entitled Electronic Control System for Automatic Rearview Mirrors for Automotive Vehicles. The Gentex mirror includes a forward light sensor providing a signal representative of light forward of the mirror, a rear light sensor providing a signal representative of light rearward of the mirror, and a control circuit responsive to the independent forward and rear signals to control the mirror prism position. When the rear sensor signal is less than a value dependent on the conditioned independent forward signal, the mirror prism is switched to the partial reflectance mode. Time averaging filters are provided to filter the output of the forward and rear light sensors. These filters prevent light "spikes" from momentarily changing the reflective state of the prism. This reduces excessive actuation of the mirror between its full reflectance and partial reflectance modes in response to changing light conditions of relatively short duration, such as passed street lights. The time constant provided by the forward signal filter is longer than the time constant provided by the rear signal filter so that (1) the ambient light reference level is more slowly effected by changing light levels to provide a reliable reference level and (2) the rear signal is adequately responsive to changes in rear light level. The Gentex circuit also includes circuit means effective to reduce the sensitivity of the mirror as a function of recent activity of the mirror prism.

The Gentex control circuit is not without its drawbacks. First, the ambient light reference level does not adequately track the changing sensitivity of the drivers' eyes which changes due to the varying ambient and rear light levels experienced under typical driving conditions. One cause of this is that the independent forward signal is filtered or time averaged using a single time constant. However, it is known that the human eye adapts more quickly to increasing light levels than it does to decreasing light levels. Second, the signal used to compute the ambient light reference level is dependent only on the light levels forward of the mirror housing and is not dependent on other significant light levels within the drivers' field of view. Third, the reduction in sensitivity of the mirror is a function of recent activity of the mirror and therefore only provides a sensitivity reduction once the mirror has changed from its partial reflectance mode back to its full reflectance day mode.

According to the present invention there is provided an automatic rearview mirror system for a vehicle comprising, a reflective element actuatable between at least two different reflective conditions, a forward light sensor to detect light forward of the mirror, a rear light sensor to detect light rearward of the mirror, a control circuit means coupled to said reflective element, said forward light sensor, and said rearward light sensor, said control circuit causing the reflective element to assume a reflective state dependent upon the output of said forward and rear light sensors, said control circuit including modulation means for modifying the output of said forward light sensor to cause a reduction in sensitivity of the mirror.

The control circuit means preferably includes a time-filter means for time filtering an ambient light signal which is at least partially dependent on the modified output of said forward sensor, said time-filter means providing faster time filtering of the signal during periods of increasing ambient light than during periods of decreasing ambient light, whereby said time filter means and therefore said control means approximates the adaption of the human eye to changing ambient light levels.

In a preferred form of the invention the forward and rear light sensors are connected in parallel with one another and in series with a modulating resistor.

According to a further aspect of the present invention there is provided an automatic rearview mirror system for a vehicle comprising, a reflective element actuatable between at least two different reflective conditions, a forward light sensor to detect light foward of the mirror, a rear light sensor to detect light rearward of the mirror, a control circuit means coupled to said reflective element, said forward light sensor, and said rearward light sensor, said control circuit causing the reflective element to assume a reflective state dependent upon the output of said forward and rear light sensors, said control circuit including means to modify the output of the forward sensor as a function of the output of the rear sensor when the mirror is in the partial reflectance mode to reduce the sensitivity of the mirror.

Embodiments of the invention will now be described by way of example, with reference to the accompanying drawings, in which.

Figure 1:
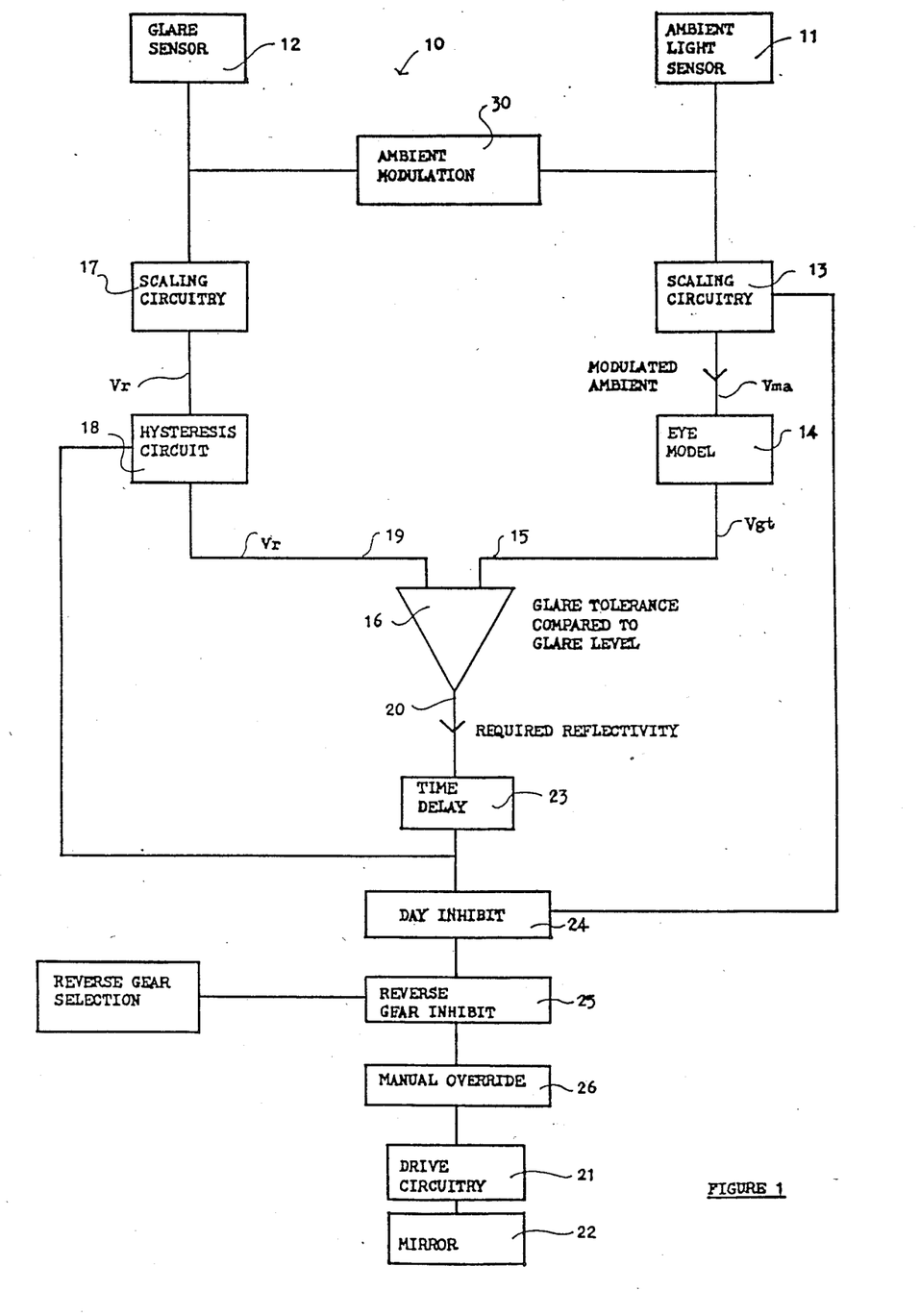
FIG. 1 is a schematic block diagram of a control system for an automatic rearview mirror according to the invention.

Referring now to the drawings and referring in particular to FIG. 1 there is shown therein a control system, generally designated 10 for an automatic rearview mirror according to the invention. The circuit includes a forward or ambient light sensor 11, and a rear or glare light sensor 12 mounted in the mirror casing to detect light generally forwardly and generally rearwardly of the mirror casing respectively. The output signal from the ambient or forward light sensor 11 is applied via scaling circuitry 13 to a time filter circuit 14 which provides faster time filtering of the forward signal during periods of increasing ambient light than during periods of decreasing ambient light, to approximate the circuit to the adaption of the human eye to changing ambient light levels. The time filter circuit 14 may be similar or identical to that described in U.S. Pat. No. 4,793,690 issued Dec. 27, 1988 and assigned to Donnelly Corporation the contents of which are incorporated herein by reference, and does not require extensive discussion in the present Application. The time filter circuit 14 provides an output signal 15 being a glare tolerance signal Vgt which is indicative of the adaption of the human eye to differing light conditions. The output signal 15 is fed to a comparator circuit 16.

The output signal from the rear light sensor 12 is fed to scaling circuitry 17 and a hysteris circuit 18, and the output signal 19 of the hysteris circuit 18 being the rear signal Vr is fed to the comparator circuit 16. The comparator circuit 16 compares the glare tolerance signal 15 with the rear signal 19 and if the glare tolerance signal 15 is greater than the rear signal 19, the comparator outputs a required reflectivity signal at 20 to move the mirror 22 to the night or partial reflectance position.

The circuit also includes a time delay function 23, a day inhibit function 24, a reverse gear inhibit function 25 and a manual override function 26.

The control system 10 also includes an ambient modulation function 30 which effectively bridges the outputs of the forward sensor 11 and rearward sensor 12. This ambient modulation function acts to modify the output signal of the forward or ambient light sensor 11 depending upon the level of the output signal from the rear or glare sensor 12. In particular, if the rear light level impinging on the rear sensor 12 increases, the output signal of the rear sensor 12 reduces, and this reduction in the rear light signal modifies the forward or ambient light signal by reducing it in proportion to the reduction in the rear light signal. Similarily if the rear light level impinging on the rear sensor decreases, the output signal of the rear sensor increases, and this increase in rear light signal modifies the forward or ambient light signal by increasing it as a proportion of the increase of the rear light signal. Therefore, the output signal of the forward or ambient light sensor 11 is modulated by the output signal of the rear sensor 12 to produce a modulated ambient signal Vma.

The time filter circuit 14 is arranged to quickly recognise increases in the light levels (i.e. a decrease in Vma) and is slow to forget an increase in light levels. Accordingly, the output signal of the time-filter circuit 14 responds rapidly to increasing rear light levels but only slowly to reducing rear light levels. The signal Vgt is therefore a modulated forward or ambient signal indicative of the eyes tolerance. This provides a desensitivity of the control system and in particular in busy traffic situations where the rear light level can oscillate or vary substantially over short time periods. More specifically, the control system is desensitised by quickly pulling the level of the Vgt signal lower than the Vr signal to maintain or change the state of the mirror to the day position. Further, because of the long time constant associated with the time-filter circuit 14 for reducing rear light levels, the value of Vgt is maintained at a low level and below the level of Vr for a long time period thus ensuring that the mirror 22 is more likely to remain in the day position during periods of high oscillating rear light levels. Of course, if the rear light level is maintained relatively constant at a high light level for a sufficient time period the value of Vgt will recover sufficiently until it exceeds Vr when the control circuit will change the mirror to the partial reflectance (night) mode.

The ambient modulation function 30 will also slightly modify the rearward signal during periods of change of the ambient light level. However, the modulation of the rear sensor signal by the forward or ambient light signal is generally small as described in more detail below. Thus, the desensitivity of the mirror is created by providing the ambient modulation so that the forward or ambient signal is dependent upon the rear signal to first produce a modulated ambient signal Vma, and second a modulated ambient signal indicative of the eyes tolerance Vgt.

Figures 2, 4:
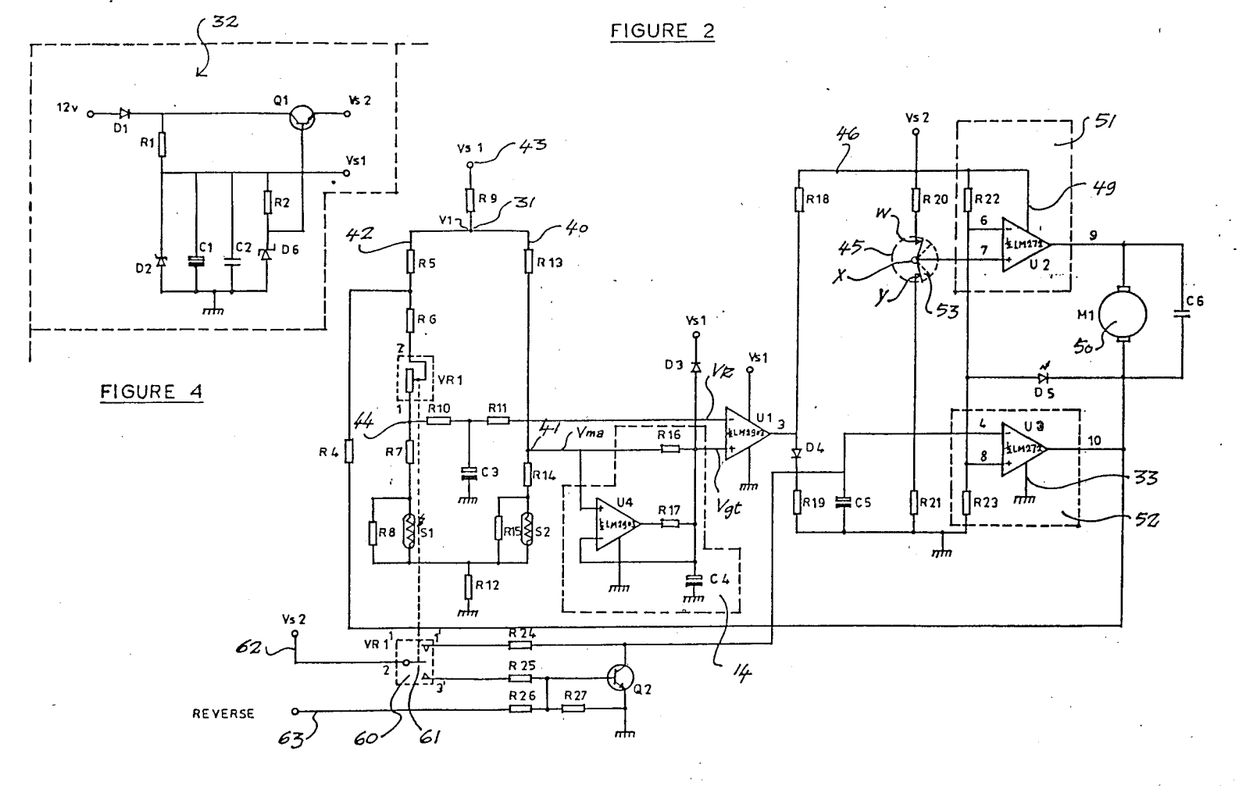
FIG. 2 is a schematic electrical diagram of a control system for an automatic rearview mirror according to the invention.
FIG. 4 is a schematic electrical diagram of a constant voltage source for use with circuit of FIG. 2.

Referring now to FIG. 2, the control system will be described in greater detail. The control system comprises an ambient or forward light sensor S2 connected in a first voltage divider 40 comprising resistors R13 and R14 connected in series with sensor S2 and resistor R15 connected in parallel with sensor S2. The resistors R13, R14 and R15 act to appropriately scale a voltage produced at node 41 which represents the ambient light level. The rear sensor S1 is connected in a second voltage divider 42 comprising resistors R5, R6 and R7 and potentiometer VR1 connected in series with the sensor S1, and resistor R8 connected in parallel with sensor S1.

The voltage dividers 40, 42 are connected in parallel, with one end of the voltage dividers connected to ground via a common resistor R12. The other end of the voltage dividers are connected to a power supply line 43 via modulating resistor R9. The sensors S1 and S2 comprise photoresistors whose resistance decreases with increasing light levels. The forward or ambient signal voltage at node 41 is applied to a comparator U1 via time-filter means 14. Similarily, the voltage at node 44 is applied to the comparator U1 via an RC circuit comprising resistor R10 and capacitor C3. Resistor R11 provides impedance matching between the two inputs to the comparator U1.

The RC circuit comprising resistor R10 and capacitor C3 provide a short time average of the rear signal of approximately 1 second. The capacitor C3 also filters out noise "spikes" which may occur at the node 44. The rear signal Vr applied to the negative input of comparator U1 is therefore a short time averaged signal of the signal appearing at node 44. The potentiometer VR1 provides a driver sensitivity adjustment known in the art.

The forward or ambient signal present at node 41 is modulated by the rear signal at node 44. Thus, if the rear light level increases the resistance of the photoresistor S1 decreases and the voltage at node 44 decreases accordingly. The decrease of voltage at node 44 produces a decrease in the voltage V1 at node 31 which produces a consequent voltage drop at node 41. Thus, the ambient signal at node 41 is modulated (Vma) by the rear signal level at node 44. It will be appreciated that the modulation of the signal at node 41 is a direct consequence of resistor R9. The voltage Vs1 at node 43 is applied from a constant voltage source 32, the voltage Vs2 being approximately 8 volts. Resistor R9 produces a voltage drop at node 31 to provide a voltage of V1. If resistor R9 is removed from the circuit (or is very small so as to be almost insignificant when compared with the resistors in the voltage dividers 40, 42) the voltage V1 at node 31 would not change at all or the change would be so small so as not to cause any modulation of the voltage at node 41 by the voltage at node 44. Consequently, the value of the resistor R9 should be significant when compared to the value of the resistors in the voltage dividers 40, 42 and so cause signigicant modulation to occur. Clearly, changes in the voltage at node 41 will also modulate the voltage at node 44, however because of the short time constant associated with RC circuit R10 and C3, the effect of this is very small and normally so small so as to be insignificant.

The time filter means 14 is a dual rate or multiple rate filter, which filters or time averages the modulated ambient signal Vma received from node 41. The dual rate filter 14 time averages the signal from node 41 with a first time constant during increasing forward lighting and with a second larger time constant during decreasing forward lighting to produce a modulated glare tolerance voltage signal Vgt at the positive input of comparator U1 which is indicative of the eyes tolerance.

The dual rate filter 14 includes a capacitor C4 connected between ground and the positive input of comparator U1. A charging resistor R16 is coupled between node 41 and the capacitor C4. The positive input of a comparator U4 is also connected to node 41 and the negative input of the comparator U4 is connected to the capacitor C4 as shown. The output of the comparator U4 is also connected to the capacitor C4 via a discharge resistor R17.

The resistance of the charging resistor R16 is larger, and preferably much larger than the resistance of the discharge resistor R17. The capacitor C4 is charged through the resistor R16 and discharged through resistors R16 and R17. During periods of low ambient lighting, the resistance of the forward light sensor S2 is relatively high, and the voltage at node 41 is also relatively high. If this voltage exceeds the charge on the capacitor C4, the capacitor will be charged through resistor R16. In this case, the positive input to comparator U4 will be high and the negative input will be low so that the output of the comparator U4 will be high thus preventing the current charging the capacitor C4 from being grounded through resistor R17 and the comparator U4. The charging resistor R16 and capacitor C4 are selected to preferably provide a time-averaging time constant of approximately 30 to 100 seconds. The time constant is the period of time required for the capacitor to store approximately 63 percent of the difference between the input voltage at node 41 and the output voltage which is applied to the positive input of comparator U1. During periods of high ambient lighting, the resistance of the forward sensor S2 will be relatively low and the voltage at node 41 will be relatively low. When this voltage is less than the voltage on the capacitor C4, the capacitor will discharge through the resistors R16 and R17. In this case, the positive input to comparator U4 will be low and the negative input will be high so that the output of the comparator U4 will be low thus enabling the capacitor to discharge through resistor R17 and the comparator U4 to ground. Because of the relatively small resistance of the resistor R17 in comparison with the charging resistor R16, discharging occurs primarily through the resistor R17. The resistor R17 and capacitor C4 are selected to preferably provide a discharging time constant of between 0 to 20 seconds. The time constant is that time period required to reduce the voltage on the capacitor C4 by approximately 63 percent of the initial voltage difference between the input voltage at node 41 and the output voltage applied to the positive input of comparator U1.

The output signal from comparator U1 is applied to drive circuitry for a reversible d.c. motor 50, the drive circuitry comprising comparator circuits 51, 52 connected across the motor 50. The reversible d.c. motor 50 provides a drive means to cause actuation of control mechanism mounted in a mirror housing to move a prism mirror between full reflectance (day) and partial reflectance (night) modes. Such control mechanisms are well known in the art.

The comparator circuits are formed from a LM272 integrated circuit. A rotary switch 45 has a central terminal X connected to the positive input pin 7 of comparator U2. The other two terminals W and Y of the rotary switch 45 are connected to resistors R20 and R21 respectively. The negative input pin 6 of comparator U2 is connected to power supply line 46 via resistor R22. The positive input pin 8 of comparator U3 is connected to the negative input pin 6 of comparator U2. Resistor R23 connects pin 8 to ground.

A capacitor C5 is connected to pin 4 of comparator U3 and a resistor R19 is connected in parallel with the capacitor C5. A resistor R18 and diode D4 are also connected in series between resistor R19 and power supply line 46. Resistor R19 and capacitor C5 are also connected to ground as shown.

A capacitor C6 connected across the motor 50 provides noise suppression and an LED D5 provides a light source to indicate when the mirror is in the night position. Pin 49 of comparator circuit U2 is connected to power supply lead 46 and pin 33 of comparator circuit U3 is grounded to provide the power supply circuit for the LM272 chip. The rotary switch 45 includes an electrically conductive switch track 53 which rotates as the mirror is moved between full and partial reflectance modes.

In the night position of the mirror 22 the output on pin 9 of comparator circuit U2 is low and the output on pin 10 of comparator circuit U3 is low thus, the motor 50 is not energised. Similarly, in the day position of the mirror 22, the output on pin 9 of comparator circuit U2 is high and the output on pin 10 of comparator circuit U3 is high and once again the motor 50 is not energised. In the night position of the mirror 22 the switch track 53 of the rotary switch 45 is connected to pin Y and thus X and Y being connected together the input to pin 7 is low. Similarly, in the day position of the mirror 22 the switch track 53 is connected to pin W and thus W and X being connected together, the input to pin 7 is high.

Also, in the day position of the mirror 22 the output of comparator U1 is low, this being the case when the rear signal level Vr is greater than the modulated forward glare tolerance signal Vgt. Conversely, in the night position of the mirror 22 the output of comparator U1 is high, this being the case when the rear signal level Vr is less than the modulated forward glare tolerance signal Vgt.

Thus, in the steady state day position of the mirror 22 the signal on the output pin 3 of comparator U1 is low and diode D4 is off and capacitor C5 is not charged. The input on pin 4 of comparator U3 is relatively low compared to the input on pin 8 and thus the output on pin 10 of comparator U3 is high. The input on pin 6 of comparator U2 is relatively low and the input to pin 7 is relatively high as the rotary contacts X and W are connected together, thus the output on pin 9 of comparator U2 is high. Since both output pins 9 and 10 which are connected across the motor 50 are high the motor 50 is not energised and the mirror remains in the day position.

Now if an increased light level is experienced by the rear sensor S1, the rear voltage signal Vr drops below Vgt so that the signal output at pin 3 of comparator U1 goes high. This switches on diode D4 and capacitor C5 is charged from supply line 46 via resistor R18. Thus, the signal on pin 4 of comparator U3 goes higher than the signal on pin 8 and the output signal on pin 10 goes low. With pin 10 low and pin 9 high the motor 50 is energised to move the mirror 22 to the night position. The motor 50 causes rotation of the switch track 53 of rotary switch 45 until in the day position the switch track 53 breaks contact with pin W and makes contact with pin Y thus producing a low input voltage to pin 7 of comparator U2 which changes the output signal on pin 9 to low and the motor 50 is switched off. The mirror 22 is now in the partial reflectance mode on night position. When the output on pin 3 of comparator U1 goes low once again, the diode D4 is switched off, and capacitor C5 discharges to ground through resistor R19 causing the voltage on pin 4 of comparator U3 to go lower than the voltage on pin 8. The output of the comparator U3 then goes high and with the output on pin 9 of comparator U2 low, the motor 50 is again energised to drive the mirror 22 to the full reflectance or day position once again.

Capacitor C5 and resistor R18 are selected to provide approximately a 1 second time delay before energising the motor 50 to provide a time delay in changing the mirror from the day to the night position. Similarly, the resistor R19 and capacitor C5 are selected to provide approximately a 4 second time delay before energising the motor 50 to provide a time delay in changing the mirror from the night to the day position.

Thus, when the output of comparator U1 goes high, corresponding to a high rear light level the mirror 22 is moved to the night position with a short time delay of about 1 second and when the output of comparator U1 goes low corresponding to a reduced rear light level the mirror goes to the day position with the longer time delay of about 4 seconds. This time delay feature (which is in addition to the time delay provided by the dual rate filter 14) reduces the sensitivity of the mirror further, particularly in the night position.

Also, as shown, a feedback resistor R4 is connected between resistors R5 and R6 and the output of comparator U3. In the night position of the mirror the output voltage on pin 10 of comparator U3 is low and a current from voltage divider 42 through resistor R4 is grounded through pin 33 of the comparator U3. This reduces the voltage V1 at node 31 and consequently the voltage at node 41. The voltage at node 41 is therefore effectively modulated or reduced (i.e. Vma) when the mirror moves to the night position. The reduction or modulation of the forward sensor voltage signal serves to reduce Vgt—which decreases with a relatively fast time constant. When the mirror goes to the day position again the voltage at node 41 increases again slightly since no current flows through resistor R4 as pin 10 of the comparator U3 is high. However, since Vgt only increases with a long time constant, the circuit is desensitised as Vgt increases only slowly. This arrangement provides a hysteresis effect making the mirror hold in the night position until the rear light level has reduced significantly below that which made it go to the night position, however, after going back to the day position leaves the mirror relatively insensitive due to a lower Vgt.

The control system also includes a manual override control and a "reverse gear forced day" control. These functions are provided by switch 60, resistors R24, R25, R26, R27 and transistor Q2 configured as shown and connected to the capacitor C5 and resistor R19. To move the mirror 22 to the night position the contact 61 of switch 60 is connected to contact 1' and the capacitor C5 is charged from power supply line 62 causing the mirror to go to the night position. Similarly, if contact 61 of the switch 60 is connected to contact 3' transistor Q2 is turned on by the power supply line being connected to the base of the transistor via resistor R25. The capacitor C5 then discharges through the transistor Q2 to ground causing the mirror to go to the day position. Similarly when reverse gear is selected by the driver, a switch (not shown) is provided to connect line 63 to the power supply line 62 again turning on the transistor Q2 to discharge the capacitor C5 if it is in a charged state.

Diode D3 is provided to enable the capacitor C4 to discharge quickly when the power supply Vsl is removed. By discharging C4 quickly it reduces the likelihood of the mirror going inadvertently to the night position following short duration power losses.

Figure 5:
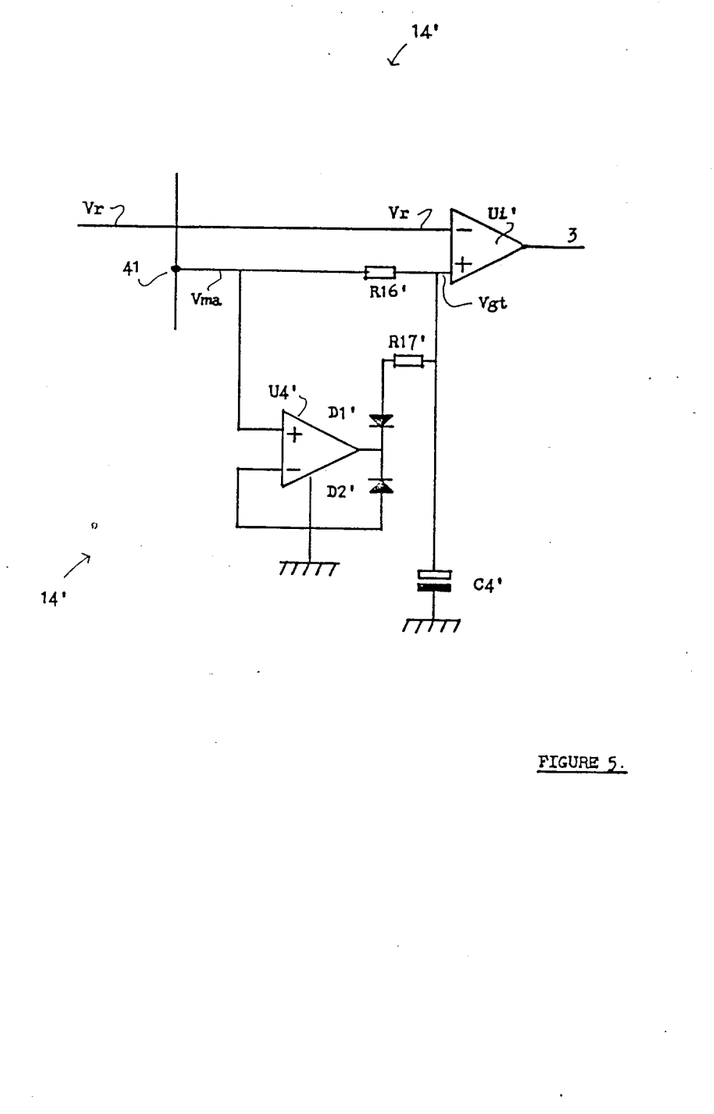
FIG. 5 is a schematic electrical diagram of a second embodiment of dual-rate filter for use in the circuit of FIG. 2.

In FIG. 5 there is shown another embodiment of dual-rate filter 14'. In this embodiment the negative input to comparator U4' is connected to capacitor C4' via two face to face diodes D1', D2' and resistor R17'. If the voltage at node 41 exceeds the charge on the capacitor C4' the capacitor is charged through resistor R16. However, the comparator U4' is configured as a voltage follower by virtue of diode D2' so that the output voltage of the comparator follows the voltage at the node 41 but by approximately 0.8 volts less because of the presence of diode D2'. In effect therefore once the voltage at node 41 decreases below the voltage of the capacitor C4', the capacitor will discharge through R17' and the diode D2' to ground. Similarly, the capacitor will discharge through R16' to ground. However, since the output voltage of the comparator U4' is 0.8 volts less than the voltage at node 41, this compensates for the voltage drop across diode D1'. Therefore, the discharge rate of the capacitor through resistor R17' is proportional to the difference between Vgt and Vma and also the discharge rate through resistor R16' is also proportional to the difference between Vgt and Vma. In contrast, it will be noted that in the embodiment of FIG. 2, the discharge rate of the capacitor C4 is proportional to the difference between Vgt and Vma when discharging through R16, but when discharging through R17 the discharge rate is proportional to the difference between Vgt and ground. Therefore, in the time filter 14' of FIG. 5 the rate of change of Vgt is more accurately proportional to the difference between Vgt and Vma. This provides a filter which operates in a manner accurately approximating the adaption of the human eye to differing light conditions.

Referring again to FIG. 2 it will be noted that in the night position of the mirror, the diode D5 is forward biassed so that it is energised to provide a light indicator when the mirror is in the night position.

Figure 3A:
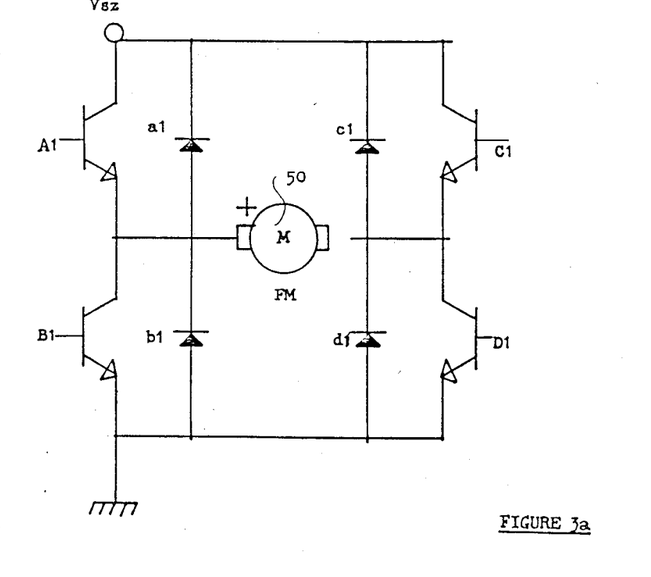
FIGS. 3a and 3b are schematic electrical diagrams of a braking circuit included in the drive circuitry of FIGS. 1 and 2.
Figure 3B:
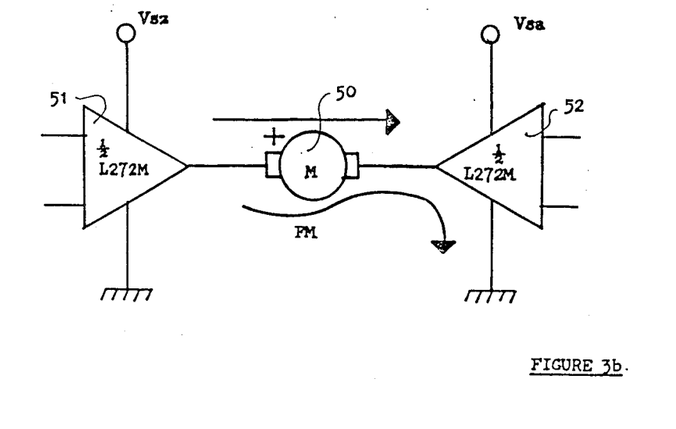

As shown in more detail in FIGS. 3a and 3b, the circuitry in the L272M integrated circuit is configured to provide a braking means to rapidly stop the electric motor 50 in either the day or night position of the mirror 22. The motor 50 is arranged in a H-shaped bridge of four transistors A1 to D1 and corresponding diodes a1 to d1. As the motor runs from the night to the day position the transistors C1 and B1 are turned on and current flows through the motor 50 from transistor C1 to transistor B1. However, as the mirror 22 moves to the day position transistor B1 turns off and transistor A1 turns on. Transistor A1 is, however, reverse biassed relative to current flow from transistor C1, and, diode a1 is forward biassed thus shorting the motor 50 between transistor C1 and diode a1. This provides dynamic braking of the motor 50 resulting in rapid stopping of the motor and accurate positioning of the mirror 22 in the day position.

Similarly, to reverse the motor direction and return the mirror 22 to the night position transistor D1 is turned on and current flows through the motor from transistor A1 to transistor D1. As the mirror 22 moves to the night position, transistor B1 is turned on and diode b1 is forward biassed thus shorting the motor between diode b1 and transistor D1 to once again provide rapid dynamic braking of the motor 50.

typical values for the components of the circuitry described hereinabove are as follows:

| | |
|---|---|
| R1 | 220 Ohms |
| R2 | 150 Ohms |
| R3 | 470K |
| R4 | 75K |
| R5 | 8K2 |
| R6 | 10K |
| R7 | 8K2 |
| R8 | — |
| R9 | 4K7 |
| R10 | 22K |
| R11 | 390K |
| R12 | 0 LINK (no resistance) |
| R13 | 47K |
| R14 | 0 LINK (no resistance) |
| R15 | 560K |
| R16 | 560K |
| R17 | 100K |
| R18 | 33K |
| R19 | 270K |
| R20 | 2K2 |
| R21 | 2K2 |
| R22 | 2K2 |
| R23 | 4K7 |
| R24 | 4K7 |
| R25 | 18K |
| R26 | 27K |
| R27 | 4K7 |
| VR1 | 470K |
| C1 | 47 mF |
| C2 | 0.022 mF |
| C3 | 1.5 mF |
| C4 | 100 mF |
| C5 | 10 mF |
| C6 | 0.022 mF |
| (U1,U4) | LM 2903 |
| (U2,U3) | L272M |

Figure 6:
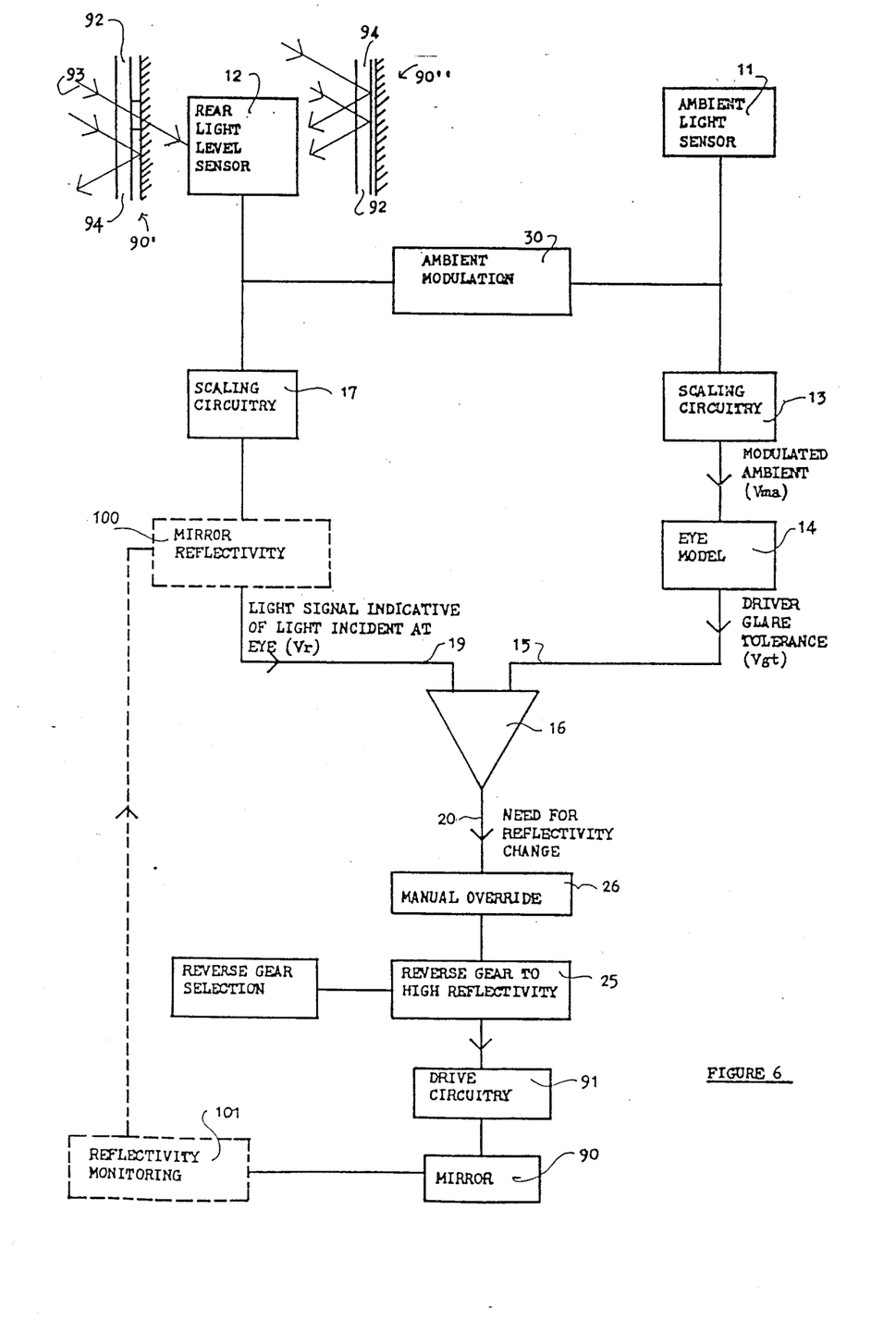
FIG. 6 is a schematic block diagram of embodiments of a control system for use with a variable reflectivity mirror according to the invention.

It will be appreciated that the output signal of comparator U1 in FIG. 2 may be used in a control circuit to control the reflectivity of an infinitely variable reflective element. As currently contemplated, such a reflective element is an electro-chromic cell having infinite variability of reflectivity from a maximum of approximately 70 or 80% to a minimum of approximately 4 to 7%. A schematic block diagram of a control system is illustrated in FIG. 6 which is similar to that described in relation to FIGS. 1 and 2 already discussed with the exception that the mirror 90 is an electro-chromic cell and the drive circuitry 91 is capable of varying the reflectivity of the mirror 90. The drive circuitry 91 is well known in the art.

The modulation means and time filter means already described herein in relation to the control of a prism type mirror, are clearly applicable to the control of the reflectivity of the electro-chromic mirror 90. The same reference numerals have been used in FIG. 6 to annotate the same functional components in FIG. 2.

Thus, in one embodiment of the invention as it is applied to an electro-chromic (EC) mirror 90, the rear light or glare sensor 12 is mounted behind the EC mirror 90'. A portion of the reflective layer 92 is removed so that light rays 93 impinging on the EC mirror 90' pass through the light absorbing layer 94 and are received by the rear light sensor 12 to produce the rear or glare signal Vr. In another embodiment of the invention, the rear light sensor 12 is mounted in front of the EC mirror 90" so that light impinging on the mirror 90 and reflected therefrom is received by the rear sensor 12 to produce the rear or glare signal Vr. Although the light reflected from the EC mirror 90 is identical to the glare perceived by the driver of a vehicle, the former embodiment in which the light passes through the EC mirror is perferred since the rear sensor 12 is preferably located behind the EC mirror as opposed to in front of it. However, in the embodiment of EC mirror requiring the light to pass through the mirror the glare signal Vr produced will be higher than that perceived by the driver and therefore a small correction in the glare signal Vr may be desirable. It will be clearly understood by those having ordinary skill in the art that the drive circuitry 91 will control the absorbance of the light absorbing layer 94 to vary the reflectivity of the EC mirror in response to the signal received from the comparator 16.

In another embodiment of the EC mirror control system, a mirror reflectivity function 100 is provided between the scaling circuitry 17 and the comparator 16 as indicated in dotted outline. A feedback loop comprising a reflectivity monitoring function 101 provides a signal indicative of the reflectivity of the mirror to the mirror reflectivity function 100. The reflectivity monitoring function 101, measures the ion or current flow in the EC mirror 90 as the reflectivity of the mirror 90 is changed. The feedback signal to the EC mirror reflectivity function 100 is effective to change the value of Vr and thus rapidly modulates Vr in response to the reflective state of the EC mirror 90, to control the output signal 20 of comparator 16 and thus rapidly achieve the desired reflectivity level of the EC mirror 90.

We claim:

1. An automatic rearview mirror system for a vehicle comprising:
   a reflective element actuatable between at least two different reflective conditions;
   a forward light sensor means for sensing light in a direction other than rearward of the mirror;
   a rear light sensor means for sensing light rearward of the mirror; and
   control circuit means for causing the reflective element to assume a reflective condition as a function of at least the output of said forward and rear light sensor means, said control circuit including modulation means for modifying the output of said forward light sensor means to produce a modified forward light signal and comparison means responsive to the output of said rear light sensor means and said modified forward light signal for indicating the desired reflectance condition of said reflective element as a function of said output of said rear light sensor and said modified forward light signal, wherein said modulation means modifies the output of said forward light sensor means in a manner that reduces the sensitivity of said control means to light rearward of the mirror.

2. A rearview mirror as claimed in claim 1 wherein the control circuit means preferably includes a time-filter means for time filtering said modified forward light signal, said time-filter means providing faster time filtering of the signal during periods of increasing ambient light than during periods of decreasing ambient light, whereby said time-filter means and therefore said control means approximates the adaption of the human eye to changing ambient light levels.

3. A rearview mirror as claimed in claim 1 wherein the forward and rear light sensor means are both variable impedance devices and wherein said modulation means includes said forward and rear light sensor means being connected in parallel with one another and in series with a modulating resistor in a network such that, with electrical power applied to said network, said modified forward light signal is the signal across said forward light sensing means.

4. A rearview mirror system as claimed in claim 2 wherein said time-filter means filters with a first time constant during periods of an increasing ambient light signal and with a second time constant during periods of a decreasing ambient light signal.

5. A rearview mirror system as claimed in claim 4 wherein said time-filter means comprises a capacitor, first and second resistors connected to a common side of the capacitor and current control means for charging said capacitor through said first resistor and discharging said capacitor through said second resistor.

6. A rearview mirror as claimed in claim 5 wherein said current control means and said resistors are configured so that the rate of discharge of the capacitor through said second resistor is proportional to the difference between the charge on the capacitor and the output signal of said forward sensor.

7. A rearview mirror system as defined in claim 1 wherein said reflective element is a prism movable between at least two positions to establish different reflective conditions of said mirror and wherein the control circuit means includes a reversible d.c. motor to change the position of said prism.

8. A rearview mirror system as claimed in claim 7 wherein the control circuit includes a rotary switch means energized by the d.c. motor means to control the position of said prism.

9. A rearview mirror as claimed in claim 1 wherein said modulation means includes circuit means to modify the output of the forward sensor means as a function of the output of the rear sensor means to reduce the sensitivity of the mirror to light rearward of the mirror and as a function of the mirror being in a partial reflectance condition to further reduce the sensitivity of the mirror to light rearward of the mirror.

10. A rearview mirror as claimed in claim 1 wherein the control circuit means includes means to provide a first time delay of a relatively short duration for changing the condition of the reflective element from a full reflectance to a partial reflectance condition, and a second time delay of a relatively longer duration for changing the condition of the reflective element from the partial reflectance to the full reflectance condition.

11. A rearview mirror as claimed in claim 1 wherein the reflective condition of said reflective element is essentially continuously variable.

12. A rearview mirror as claimed in claim 7 wherein the control circuit means includes braking means for said reversible d.c. motor.

13. A rearview mirror as claimed in claim 11 wherein said rear sensor means is mounted behind the reflective element and said reflective element is non-reflective in the region of said rear sensor.

14. A rearview mirror as claimed in claim 2 wherein the forward and rear light sensor means are both variable impedance devices and wherein said modulation means includes said forward and rear light sensor means being connected in parallel with one another and in series with a modulating resistor in a network such that, with electrical power applied to said network, said modified forward light signal is the signal across said forward light sensing means.

15. An automatic rearview mirror system for a vehicle comprising, a reflective element actuatable between a full reflectance mode in which substantially all incident light striking said reflective element is reflected and a partial reflectance mode in which only a portion of incident light striking said reflective element is reflected, a forward light sensor to detect light forward of the mirror, a rear light sensor to detect light rearward of the mirror, a control circuit means coupled to said reflective element, said forward light sensor and said rearward light sensor, assume one of said reflective modes dependent upon the relationship between the output of said rear light sensor and a sensitivity signal, said control circuit including modulation means for modifying the output of the forward sensor as a function of the reflectance mode of said reflectance element and means responsive to the output of said forward light sensor for establishing said sensitivity signal, wherein said modulation means reduces the sensitivity of the mirror system to light rearward of the mirror when said reflectance element is in said partial reflectance mode.

16. An automatic rearview mirror system for a vehicle comprising:
- a reflective element actuated between at least two different reflective conditions;
- a modulating resistor;
- a forward light sensor means for sensing light in a direction other than rearward of the reflectance element, said forward light sensing means having a parameter that varies in response to light;
- a rear light sensor means for sensing light rearward of the reflective element, said rearward light sensing means having a parameter that varies in response to light;
- said forward and rear light sensor means being connected in parallel with one another and in series with said modulating resistor between a pair of supply voltage terminals such that a change in said parameter of said rearward sensor means will modify said parameter of said forward sensor means;
- means responsive to said parameter of said forward light sensor means for producing a forward light signal;
- means responsive to said parameter of said rearward light sensor means for producing a rearward light signal; and
- comparison means for comparing said rearward light signal with said forward light signal and for causing the reflective element to assume a reflective condition as a function of the relationship between said signals.

* * * * *

UNITED STATES PATENT AND TRADEMARK OFFICE
CERTIFICATE OF CORRECTION

PATENT NO.   : 4,886,960

DATED        : December 12, 1989

INVENTOR(S)  : Keith W. Molyneux and Thomas D. Gaffney

It is certified that error appears in the above-identified patent and that said Letters Patent is hereby corrected as shown below:

Column 9, line 15:
  "typical" should be --Typical--.

Column 12, Claim 15, line 27:
  After "sensor," add --said control circuit causing the reflective element to--.

Signed and Sealed this

Twentieth Day of August, 1991

*Attest:*

HARRY F. MANBECK, JR.

*Attesting Officer*      *Commissioner of Patents and Trademarks*